United States Patent [19]

Sabec

[11] 4,102,427
[45] Jul. 25, 1978

[54] COMPACT STEERING AXLE ASSEMBLY

[75] Inventor: Charles J. Sabec, Chagrin Falls, Ohio

[73] Assignee: Towmotor Corporation, Mentor, Ohio

[21] Appl. No.: 791,906

[22] Filed: Apr. 28, 1977

[51] Int. Cl.² .............................................. B62D 5/10
[52] U.S. Cl. ...................................... 180/156; 92/138
[58] Field of Search ................ 180/154, 160; 280/773; 92/138

[56] References Cited

U.S. PATENT DOCUMENTS

| | | | |
|---|---|---|---|
| 2,411,570 | 11/1946 | Hawkins | 280/772 |
| 2,779,427 | 1/1957 | Lincoln | 280/154 |
| 2,997,123 | 8/1961 | Barton | 180/145 |
| 3,480,100 | 11/1969 | Gaulke | 180/155 |
| 3,768,585 | 10/1973 | Matteo | 180/154 |

*Primary Examiner*—John A. Pekar
*Attorney, Agent, or Firm*—Phillips, Moore, Weissenberger, Lempio & Majestic

[57] ABSTRACT

A steering axle assembly including an elongated main frame, a pair of steering knuckles, each rotatably mounted on one end of the main frame and rotatably supporting steerable wheels, a hydraulic cylinder rigidly fixed to the main frame and having ports on each end through which hydraulic fluid is received, a piston slidable within the cylinder, a lever extending from outside the cylinder into the cylinder and connected to the piston, and a pair of tie rods each pivotally connected to the lever outside the cylinder and to the steering knuckles. The lever has a pivot between its ends so that as the piston reciprocates within the cylinder, the tie rods are movable to rotate the steering knuckles, and hence the wheels attached to the knuckles.

14 Claims, 3 Drawing Figures

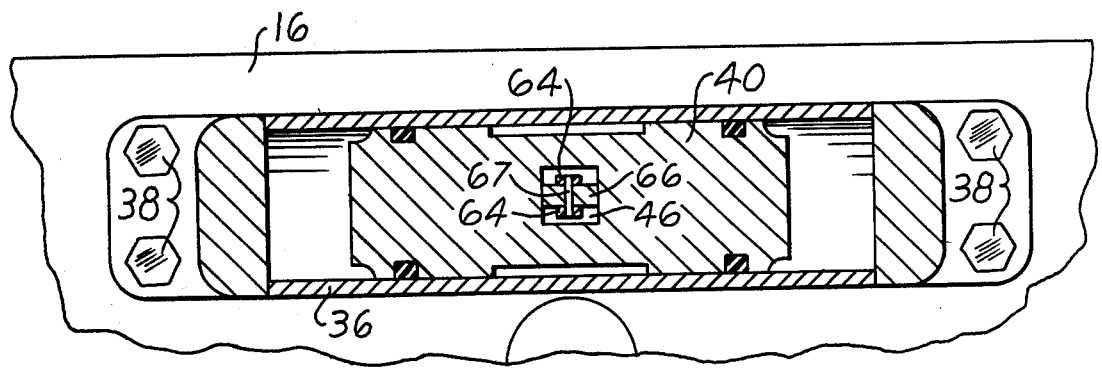
_Fig_2_
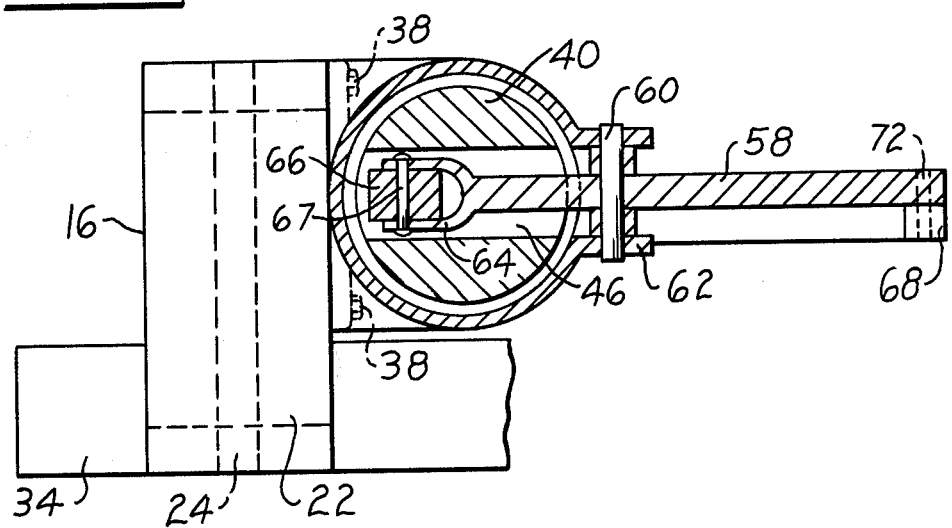
_Fig_3_

COMPACT STEERING AXLE ASSEMBLY

BACKGROUND OF THE INVENTION

The present invention relates to steering axle assemblies and, more particularly, to a power steering axle assembly for industrial trucks or the like.

Vehicles such as industrial trucks and the like must be very manueverable in order to function efficiently. In an attempt to provide this efficiency, a number of steering axle assemblies have been designed in which they all basically include a hydraulic cylinder, a piston, tie rods and steering knuckles coupling the steering wheels of the vehicle to the tie rods. The tie rods are movable by the cylinder and piston arrangement so as to rotate the steering knuckles and, hence, the wheels about a vertical axis.

These prior art arrangements usually have design constraints such that one or more advantageous features must be sacrificed totally or at least to some degree to provide an assembly which has other advantages. For example, it is desirable to design a steering axle assembly which is (1) compact, (2) easy to service, (3) easy to manufacture, and (4) simple and inexpensive. It is also desirable to produce a system which has more rigid parts which are immovable so as to prevent distortion of these parts, and to steer the wheels about a central pivot between the wheels to make more efficient use of the forces acting to steer the wheels. Until now, such a steering assembly having all these advantages has not been available.

SUMMARY OF THE INVENTION

The present invention is directed to overcoming one or more of the problems as set forth above. According to the present invention, the steering axle assembly includes an elongated main frame, a pair of steering knuckles, each rotatably mounted on one end of the main frame and rotatably supporting the wheels, a hydraulic cylinder rigidly fixed to the main frame and having ports on each end through which hydraulic fluid is received, a piston slidable within the cylinder, a link means extending from outside the cylinder into the cylinder and connected to the piston, and a pair of tie rods each pivotally connected to the link means outside the cylinder and to the steering knuckles. The link means has a pivot between its ends so that as the piston reciprocates within the cylinder, the tie rods are movable to rotate the steering knuckles, and hence the wheels attached to the knuckles.

BRIEF DESCRIPTION OF THE DRAWINGS

FIG. 2 is a section taken along lines 2—2 of FIG. 1.
FIG. 3 is a section taken along lines 3—3 of FIG. 1.

DETAILED DESCRIPTION OF THE INVENTION

Figure 1:
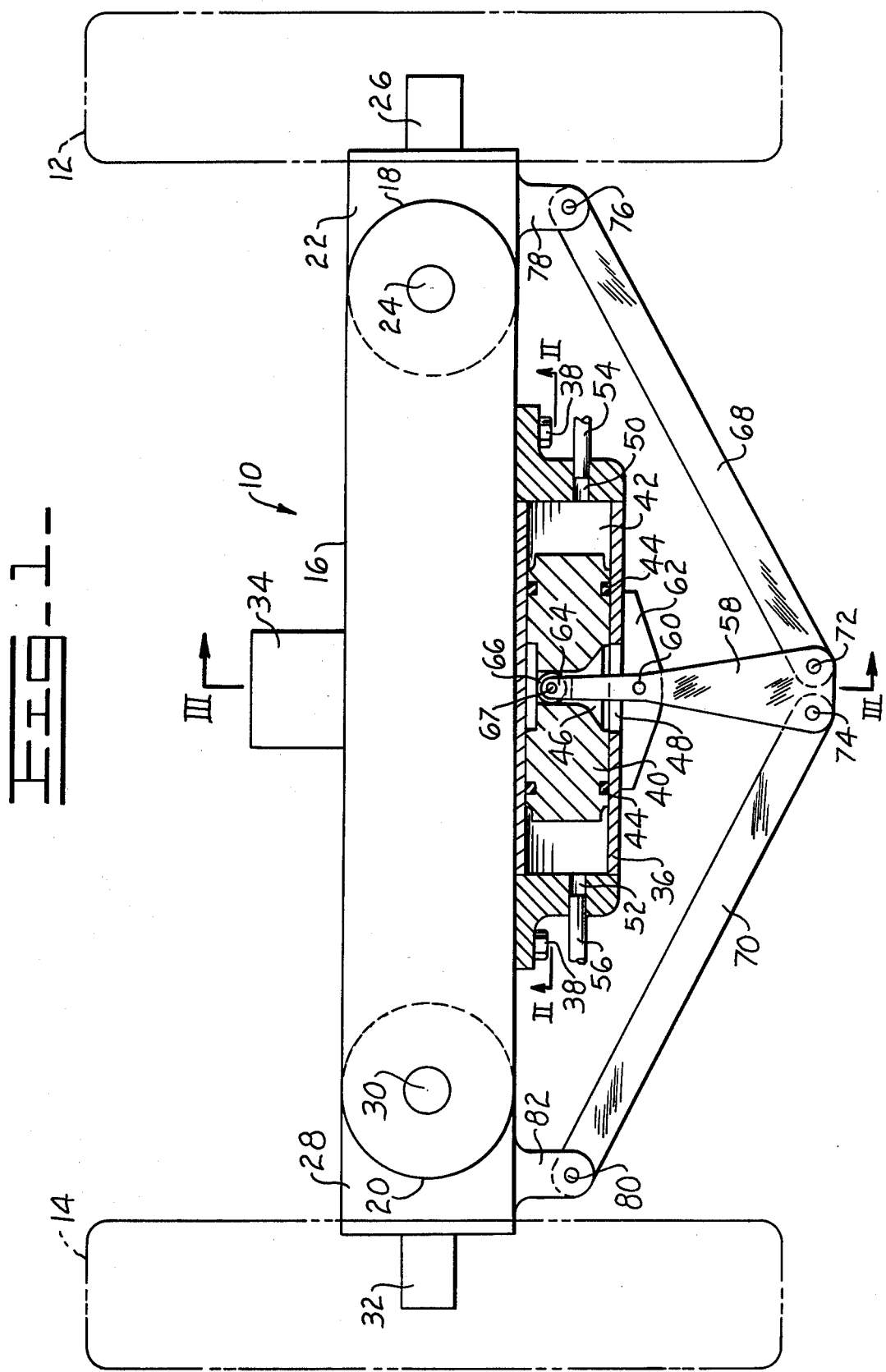
FIG. 1 is a plan view of the steering axle assembly of the present invention.

With reference to FIGS. 1-3, there is illustrated a steerable axle assembly 10 controlled by the standard steering wheel or other controls (not shown) of a vehicle to turn the steerable wheels 12, 14 of the vehicle. The assembly 10 comprises an elongated center beam or main frame 16 having curved ends 18 and 20. A steering knuckle 22 is pivotally mounted by a king pin 24 to one end 18 of the main frame 16. Steering knuckle 22 has an axle 26 which supports wheel 12 for rotation about the axis of axle 26. Another steering knuckle 28 is pivotally connected by a king pin 30 to the other end 20 of main frame 16. Steering knuckle 28 has an axle 32 which supports wheel 14 for rotation about the axis of this axle 32. Steering knuckles and king pins are well known in the art and, therefore, a detailed description of these elements is not considered necessary for an understanding of the invention. These steering knuckles are pivotable about a vertical axis represented by the king pins 24 and 30 to rotate the wheels 12 and 14 about such axes.

The main frame 16 is mounted on the vehicle (not shown) in a suitable manner, preferably by a suitable support including a cylindrical trunnion shaft 34 located at the center of the frame 16 as viewed in FIG. 1. This mounting permits the main frame 16 to pivot with respect to the vehicle about the axis of the trunnion shaft 34. A cylinder 36 is rigidly mounted to the main frame 16 by bolts 38 so that the cylinder does not move relative to this frame 16. A piston 40 can slide or reciprocate within chamber 42 defined by the walls of cylinder 36 and has seals 44 at either end of the piston to seal the chamber 42. The piston 40 also has a radially extending tapered opening or recess 46 which is aligned with an elongated opening 48 in the cylinder 36 as the piston reciprocates within chamber 42. The cylinder 36 also includes two ports 50 and 52 at either end to which rigid hyraulic lines 54 and 56 are connected to introduce hydraulic fluid into chamber 42 on either side of the piston 40.

A link or center pivot lever 58 is pivotally connected by a pivot 60 to a bracket 62 fixed to the outside of cylinder 36. The lever 58 extends to one end 64 which is bifurcated and is received within the recess 46. Lever 58 supports a bearing 66 at this end by a shaft 67. The bearing may be, for example, a roller in rolling contact with one of the walls of recess 46. The other end of lever 58 has two tie rods 68 and 70 pivotally coupled to it by pivots 72 and 74, respectively. Tie rod 68 is also connected by a pivot 76 to a lever arm 78 of the steering knuckle 22. Tie rod 70 is connected by a pivot 80 to a lever arm 82 of the steering knuckle 28.

The operation of the invention will now be described. If it is desired to steer wheels 12 and 14 in a clockwise direction as viewed in FIG. 1, the operator of the vehicle turns the steering wheel or other controls (not shown) to introduce hydraulic fluid through line 56 and port 52 into the chamber 42 on the left side of piston 40. This fluid will cause piston 40 to move to the right, which will in turn cause center pivot lever 58 to rotate about pivot 60 in a clockwise direction. Consequently, tie rods 68 and 70 will also cause steering knuckles 22 and 28 to rotate in a clockwise direction about king pins 24 and 30, thereby rotating wheels 12 and 14 with them.

If the wheels 12 and 14 are to be turned in a counterclockwise direction, then the operator turns the steering wheel or activates other controls to introduce hydraulic fluid through line 54 and port 50 into chamber 42 to the right of piston 40. The piston will then move the the left causing center pivot lever 58 to rotate in a counterclockwise direction about pivot 60. Correspondingly, tie rods 68 and 70 will cause steering knuckles 22 and 28 to rotate about king pins 24 and 30 in a counterclockwise direction, carrying wheels 12 and 14 with them.

Details of the hydraulic circuit for introducing fluid into the chamber 42 through lines 54 or 46 would be well known to those skilled in the art and therefore have not be described herein.

The present invention has a number of advantages, as will now be described. First, the use of a fixed cylinder attached to the main frame 16, together with piston 40 which moves only one pivot lever 58, rather than piston rods extending, for example, from either end of the piston, makes for a relatively compact steer axle assembly. Second, the steer axle 10 is easy to service; for example, if the lever 58 or bearing 66 needs replacement, this can be easily done by removing the pivot 60 and sliding the lever and bearing out of recess 46 and through opening 48. Similarly, if the cylinder 36 or piston 40 needs repair or replacement, this can be readily accomplished by removing the lever 58 as described above and removing bolts 38. Third, it is also apparent that in view of the simplicity of assembly 10, it will be relatively easy to manufacture. Fourth, the hydraulic lines 54 and 56 are stationary since the cylinder 36 is stationary. Thus, this provides a more reliable hydraulic circuit which, if flexible lines were needed, would possibly fail due to continuous bending. Fifth, the lever 58 is center pivoted, i.e., pivot 60 is at the center of the assembly 10 in relation to the wheels 12 and 14; this also enables the use of a more compact steering axle. Sixth, the elements 82,80,70,74,72,68 and 76 are all in line, whereby only planar forces are acting, thereby eliminating the possibility of a couple and thus offering improved performance.

It is also to be noted that the seals 44 are positioned such that reciprocal movement of the piston 40 will not expose them to opening 48. Thus, since these seals are never exposed to the environment through opening 48 or otherwise, they will not become dirty and, therefore, not require replacement.

While the invention has been particularly shown and described with reference to a preferred embodiment thereof, it will be understood by those skilled in the art that the foregoing and other changes in form and details may be made therein without departing from the spirit and scope of the invention.

The embodiments of the invention in which an exlusive property or privilege is claimed are defined as follows:

1. A steering axle assembly for steering wheels of a vehicle, comprising:
   (a) an elongated main frame;
   (b) a pair of steering knuckles, each of said knuckles rotatably supporting one of the wheels and pivotally secured to one end of said main frame for rotation about said one end;
   (c) a hydraulic cylinder rigidly fixed to said main frame and having a port on each end for receiving hyraulic fluid through each said port;
   (d) a piston slidable within said cylinder;
   (e) link means, coupled at a first end to said piston and extending through said cylinder to a second end outside said cylinder, said link means having a pivot intermediate said first and said second ends and about which said link means is rotatable; and
   (f) a pair of rods, each pivotally connected at one end to said second end of said link means and pivotally connected at another end to one of said steering knuckles.

2. A steering axle assembly according to claim 1 wherein said cylinder has an opening between the ends of said cylinder, said link means extending through said opening.

3. A steering axle assembly according to claim 2 wherein said piston includes walls defining a radial recess aligned with said opening, said link means extending through said opening and into said recess.

4. A steering axle assembly according to claim 3 further comprising a bracket connected to the outside of said cylinder, said link means being connected to said bracket by said pivot.

5. A steering axle assembly according to claim 4 wherein said first end of said link means supports a bearing means in abutment with said walls of said recess.

6. A steering axle assembly according to claim 5 wherein said bearing means is a roller.

7. A steering axle assembly according to claim 2 wherein said piston includes at opposite ends seals in contact with the walls of said cylinder, said seals being positioned so that they will not be open to said opening as said piston slides in said cylinder.

8. A steering axle assembly according to claim 1 wherein said link means comprises a lever and said pivot is centered in relation to said steering knuckles.

9. A steering axle assembly according to claim 1 further comprising a pair of rigid hydraulic lines, each connected to one of said ports to supply hydraulic fluid to said cylinder.

10. A steering axle assembly according to claim 1 wherein said first end of said link means includes means for permitting said first end to move with respect to said piston as said piston slides within said cylinder.

11. A steering axle assembly according to claim 10 wherein said piston includes walls defining a radial recess and said permitting means includes means for rolling within said recess.

12. A steering axle assembly according to claim 1 wherein said cylinder has an elongated opening between the ends of said cylinder, said link means extending through said opening to be free of contact with said cylinder as said piston slides.

13. A steering axle assembly for steering wheels of a vehicle, comprising:
   (a) an elongated main frame;
   (b) a pair of steering knuckles, each of said knuckles rotatably supporting one of the wheels and pivotally secured to one end of said main frame for rotation about said one end;
   (c) a hydraulic cylinder rigidly fixed to said main frame and having a port on each end for receiving hydraulic fluid through each said port and an opening between the ends of said cylinder;
   (d) a piston slidable within said cylinder and having walls defining a radial recess tapering inwardly from said opening;
   (e) a bracket connected to the outside of said cylinder;
   (f) link means, coupled at one end to said piston and extending from said recess and said opening to another end outside said cylinder, said link means being connected to said bracket by a pivot about which said link means is rotatable, wherein said one end of said link means supports a roller in abutment with said walls; and p1 (g) a pair of rods, each pivotally connected at one end to said other end of said link means and pivotally connected at another end to one of said steering knuckles.

14. A steering axle assembly according to claim 13 wherein said link means includes a lever which tapers from said other end towards said one end of said link means.

* * * * *